United States Patent
Kim et al.

(10) Patent No.: US 9,733,777 B2
(45) Date of Patent: Aug. 15, 2017

(54) TOUCH SENSING DEVICE AND METHOD FOR DRIVING THE SAME

(71) Applicant: Samsung Display Co., Ltd., Yongin-si, Gyeonggi-do (KR)

(72) Inventors: Kyung Man Kim, Seoul (KR); Jeong Kyoo Kim, Suwon-si (KR)

(73) Assignee: Samsung Display Co., Ltd. (KR)

( * ) Notice: Subject to any disclaimer, the term of this patent is extended or adjusted under 35 U.S.C. 154(b) by 15 days.

(21) Appl. No.: 14/855,125

(22) Filed: Sep. 15, 2015

(65) Prior Publication Data

US 2016/0246412 A1    Aug. 25, 2016

(30) Foreign Application Priority Data

Feb. 23, 2015  (KR) .................. 10-2015-0025407

(51) Int. Cl.
  *G09G 5/00*       (2006.01)
  *G06F 3/044*      (2006.01)
  *G06F 3/041*      (2006.01)
  *G06F 3/0488*     (2013.01)

(52) U.S. Cl.
  CPC .......... *G06F 3/044* (2013.01); *G06F 3/0416* (2013.01); *G06F 3/04883* (2013.01); *G06F 2203/04112* (2013.01)

(58) Field of Classification Search
  CPC .................. G06F 3/044; G06F 3/0416; G06F 2203/04111
  USPC ........................................ 345/174; 178/18.06
  See application file for complete search history.

(56) References Cited

U.S. PATENT DOCUMENTS

| | | | |
|---|---|---|---|
| 2015/0042600 A1* | 2/2015 | Lukanc | G06F 3/0412 345/174 |
| 2015/0062075 A1* | 3/2015 | Wakuda | G06F 3/044 345/174 |
| 2016/0188081 A1* | 6/2016 | Kim | G06F 3/0416 345/174 |

FOREIGN PATENT DOCUMENTS

| | | |
|---|---|---|
| KR | 10-2012-0078072 | 7/2012 |
| KR | 10-2012-0078073 | 7/2012 |
| KR | 10-2013-0078937 | 7/2013 |
| KR | 10-2013-0136378 | 12/2013 |
| KR | 10-2014-0083214 | 7/2014 |
| KR | 10-2014-0093445 | 7/2014 |

* cited by examiner

*Primary Examiner* — Jennifer Nguyen
(74) *Attorney, Agent, or Firm* — Innovation Counsel LLP

(57) ABSTRACT

A touch sensing device includes: a touch panel on which a plurality of touch sensor electrodes are formed; a touch driver for supplying a touch driving signal to the touch sensor electrodes and receiving a touch detection signal generated by the touch driving signal; a touch controller for storing a history indicating that respective touch sensor electrodes are touched in the memory by using the touch detection signal; and a memory configured to communicate with the touch controller, wherein the touch controller controls the touch driver to read the history from the memory, determines electrodes for which a number of touch events is greater than a threshold number of touch events by using the history, and supply the touch driving signal to the determined electrodes.

19 Claims, 8 Drawing Sheets

FIG. 3

| T11 210 | T12 10 | T13 30 | T14 20 |
|---|---|---|---|
| T21 5 | T22 210 | T23 155 | T24 50 |
| T31 19 | T32 40 | T33 190 | T34 20 |
| T41 4 | T42 210 | T43 244 | T44 10 |

TOUCH SENSING DEVICE AND METHOD FOR DRIVING THE SAME

CROSS-REFERENCE TO RELATED APPLICATION

This application claims priority to Korean Patent Application No. 10-2015-0025407 filed in the Korean Intellectual Property Office on Feb. 23, 2015, and all the benefits accruing therefrom, the contents of which are herein incorporated by reference in their entirety.

BACKGROUND (a) Field

Embodiments of the present disclosure are directed to a touch sensing device and a driving method thereof. More particularly, the present inventive concept relates to a method and a device for reducing power consumption and improving touch accuracy.

(b) Discussion of the Related Art

Recently, touch sensors for inputting information through touching motions have been widely used as information input devices. The touch sensor transforms a change of pressure applied to the touch sensor or capacitance occurring at a specific portion into electrical input signals. The touch sensor detects a position, an area, a pressure, and capacitance that are generated when a touching object for applying a touch to the touch sensor is touched on the touch sensor. Here, the touching object represents an object for applying a touch to the touch sensor, such as fingers, touch pens, stylus pens, or pointers.

The touch sensor uses at least one type of touching method, such as the resistive type, the capacitive type, the electro-magnetic type (EM), or the optical type, to sense a touch (or a touching input) applied to the touch sensor.

The capacitive touch sensor includes a sensing capacitor including a plurality of sensing electrodes for transmitting a detection signal, and determines whether a touch occurs or not, and a touch position by detecting a change in capacitance of the sensing capacitor or an amount of charges when a conductor such as a finger approaches the touch sensor.

The capacitive touch sensor applies a touch driving signal to all sensing electrodes for each frame so it increases power consumption.

The above information disclosed in this Background section is only to enhance the understanding of the background and therefore it may contain information that does not form the prior art.

SUMMARY

Embodiments of the present disclosure have been made in an effort to solve the above-mentioned problem and other problems. Embodiments of the present disclosure are to provide a method for reducing power consumed to sense a touch input and by a touch sensing device using the same.

Embodiments of the present disclosure are to provide a method for improving accuracy of a touch input and a terminal using the same.

An exemplary embodiment provides a touch sensing device including: a touch panel on which a plurality of touch sensor electrodes are formed; a touch driver for supplying a touch driving signal to the touch sensor electrodes and receiving a touch detection signal generated by the touch driving signal; a touch controller for storing a history indicating that respective touch sensor electrodes are touched in a memory by using the touch detection signal; and a memory configured to communicate with the touch controller, wherein the touch controller controls the touch driver to read the history from the memory, determines electrodes for which a number of touch events is greater than a threshold number of touch events by using the history, and supplies the touch driving signal to the determined electrodes.

The touch driver may output the touch driving signal during a driving period in consecutive frames.

The touch controller may control the touch driver to selectively output the touch driving signal to the determined electrodes during a predetermined driving period in the consecutive frames.

The touch driver may selectively output the touch driving signal to the determined electrodes and do not outputs the touch driving signal to undetermined electrodes during a predetermined driving period.

The touch sensing device may include a first operation stage for collecting touch history and a second operation stage for controlling the touch sensing device using the collected touch history, and the touch controller may control the touch driver to output the touch driving signal more frequently during the second operation stage than the first operation stage to the determined electrodes.

The touch controller may refresh the history of touch events stored in the memory when a predetermined time passes after the touch driver outputs the touch driving signal.

The touch controller may refresh the history of touch events in the memory after the touch driver outputs the touch driving signal more than a predetermined number of times.

The touch controller may receive information on an application software from an application processor for driving the application software, correlates the history of the touch events and the information on the application software, and stores the history of the touch events and the information on the application software in the memory while the application software is driven.

When the application software is driven again, the touch controller may control the touch driver to read the history from the memory, determines an electrode for which a number of touch events is greater than a threshold number of touch events by using the history, and selectively supplies the touch driving signal to the determined electrodes.

The touch panel may include a plurality of self-sensing capacitors connected to the touch driver through respective touch wires.

Another embodiment provides a method for driving a touch sensing device including: supplying a touch driving signal to a plurality of touch sensor electrodes formed on a touch panel; receiving touch detection signals generated by the touch driving signal; storing a history of touch events of respective touch sensor electrodes in a memory by using the touch detection signals; determining electrodes for which a number of touch events is greater than a threshold number of touch events by using the history; and supplying the touch driving signal to the determined electrodes.

The supplying of a touch driving signal to a plurality of touch sensor electrodes includes outputting the touch driving signal during a driving period in consecutive frames.

The supplying of the touch driving signal to the determined electrodes includes selectively outputting the touch driving signal to the determined electrodes during a predetermined driving period in the consecutive frames.

The supplying of a touch driving signal to a plurality of touch sensor electrodes includes selectively outputting the touch driving signal to the determined electrodes during a predetermined driving period.

The touch sensing device may include a first operation stage for collecting touch history and a second operation stage for controlling the touch sensing device using the collected touch history, and the supplying of the touch driving signal to the determined electrodes includes outputting the touch driving signal more frequently during the second operation period than the first operation stage to the determined electrodes.

The method may further include refreshing the history of touch events stored in the memory when a predetermined time passes after the touch driving signal is output.

The method may further include refreshing the history of touch events in the memory after the touch driving signal is output more than a predetermined number of times.

The method may further include, before the supplying of a touch driving signal to the touch sensor electrodes, receiving information on an application software from an application processor for driving the application software, wherein the storing of a history of touch events of respective touch sensor electrodes in a memory by using the touch detection signal includes correlating the history of the touch events and the information on the application software and storing the history of the touch events and the information on the application software in a memory while the application software is driven.

The determining of an electrode for which a number of touch events is greater than a threshold number of touch events by using the history includes, when the application software is driven again, reading the history from the memory, and determining an electrode for which a number of touch events is greater than a threshold number of touch events by using the history.

According to at least one of the embodiments, power consumption of the touch sensing device can be reduced.

According to at least one of the embodiments, accuracy of touch inputs can be improved.

An additional range of applicability will become clear from the following detailed description. However, since various modifications and alternations within the spirit and scope may be clearly understood by those skilled in the art, it is to be understood that a detailed description and a specific exemplary embodiment, such as an exemplary embodiment, are provided only by way of example.

BRIEF DESCRIPTION OF THE DRAWINGS

FIG. 3 shows a touch history of a touch sensing device according to an exemplary embodiment.

DETAILED DESCRIPTION OF THE EMBODIMENTS

Figure 1:
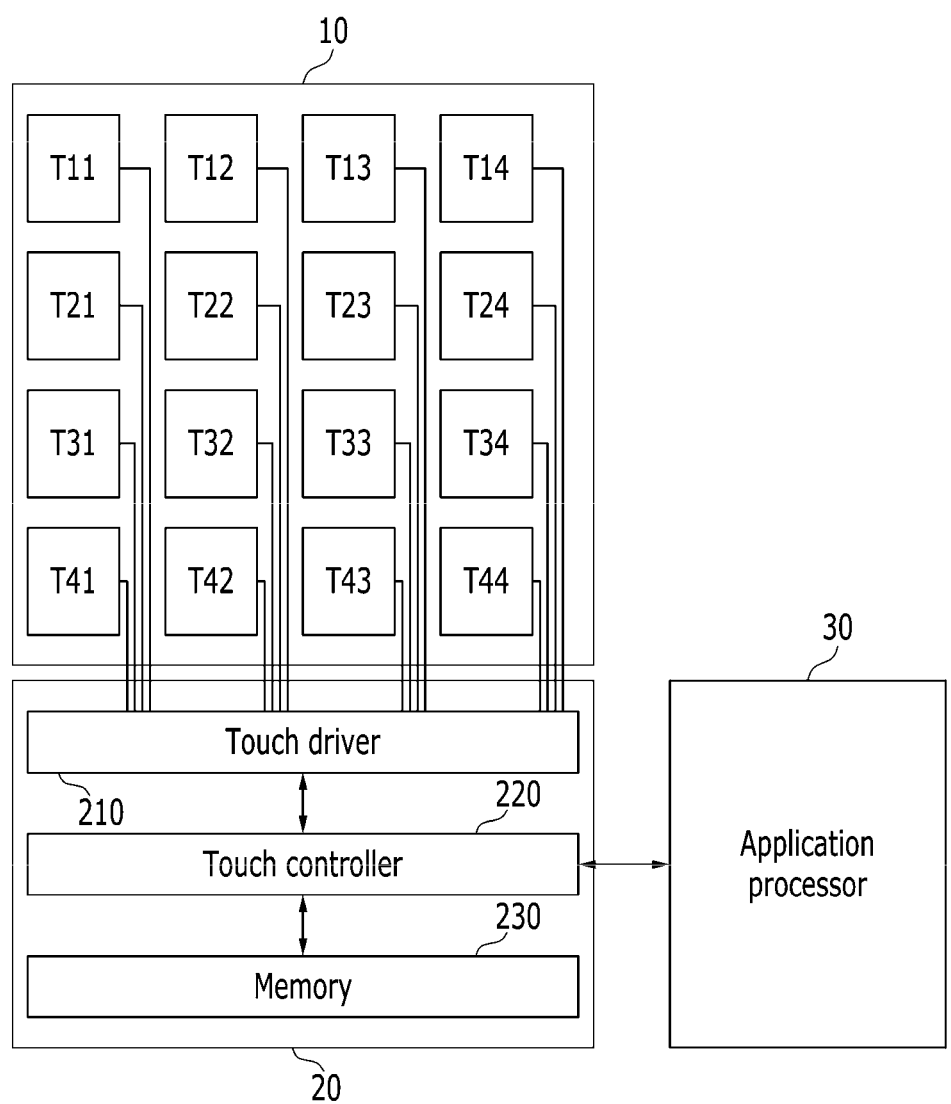
FIG. 1 shows a block diagram of a touch sensing device according to an exemplary embodiment.

Hereinafter, exemplary embodiments disclosed in the present specification will be described in detail with reference to the accompanying drawings. In the present specification, the same or similar components will be denoted by the same or similar reference numerals, and overlapping descriptions thereof will be omitted. The terms "module" and "unit" for components used in the following description are used only in order to make the specification more clear. Therefore, these terms do not have meanings or roles that distinguish them from each other by themselves. In describing exemplary embodiments of the present specification, when it is determined that a detailed description of the well-known art associated with the present inventive concept may obscure the gist, it will be omitted. The accompanying drawings are provided only in order to allow exemplary embodiments disclosed in the present specification to be easily understood and are not to be interpreted as limiting the spirit disclosed in the present specification, and it is to be understood that the present inventive concept includes all modifications, equivalents, and substitutions without departing from the scope and spirit.

Terms including ordinal numbers such as first, second, and the like, will be used only to describe various components, and are not interpreted as limiting these components. The terms are only used to differentiate one component from other components.

It is to be understood that when one component is referred to as being "connected" or "coupled" to another component, it may be connected or coupled directly to another component or be connected or coupled to another component with the other component intervening therebetween. On the other hand, it is to be understood that when one component is referred to as being "connected or coupled directly" to another component, it may be connected to or coupled to another component without the other component intervening therebetween.

Singular forms are to include plural forms unless the context clearly indicates otherwise.

It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

However, it will be easily understood by a person of an ordinary skill in the art that configurations according to exemplary embodiments described in the present specification can be applied to mobile phones, smart phones, laptop computers, digital broadcasting terminals, personal digital assistants (PDAs), portable multimedia players (PMPs), navigation devices, slate PCs, tablet PCs, ultrabooks, wearable devices, for example, watch-type terminals (smartwatches), glass-type terminals (smart glasses), head mounted displays (HMDs), and fixed terminals, such as, digital TVs, desktop computers, digital signages, etc.

FIG. 1 shows a block diagram of a touch sensing device according to an exemplary embodiment. The touch sensing device 20 includes a touch panel 10 including a plurality of touch sensor electrodes T11 to T44, a touch driver 210, a memory 230, and a touch controller 220 for controlling the touch sensing device 20.

The touch panel 10 is configured to detect touches of a user, and it may generate a touch detection signal supplied to the touch driver 210 through a touch wire. For example, the touch panel 10 may detect the user's touch using any type of pointing tools, such as a part of a body (e.g., a finger), a stylus, and the like.

The pointing tools will refer to objects, including devices (e.g., an active stylus and a passive stylus) and parts of the body (e.g., fingers or palms), that can be detected by the touch panel 10.

The touch panel 10 may be disposed on the display panel to detect a touch of the user touching a screen disposed on the display panel. The display panel may include at least one of a liquid crystal display (LCD) panel, a thin film transistor liquid crystal display (TFT LCD) panel, an organic light-emitting diode (OLED) panel, a flexible display panel, a 3D display panel, and an e-ink display panel.

The touch sensor electrodes T11 to T44 may include a transparent conductive material, such as an ITO, an IZO, a metal nanowire, a conductive polymer, a metal mesh, or a thin metal layer.

The touch sensor electrodes T11 to T44 may receive a touch driving signal from the touch driver 210, generate a touch detection signal which is changeable by a contact, and transmit the same to the touch driver 210.

When the touch sensor electrodes T11 to T44 form a self-sensing capacitor with an external object, the touch sensor electrodes T11 to T44 receive the touch driving signal and are charged with a predetermined amount of charge. When a foreign object such as a finger contacts a touch region or it approaches the touch region, the stored amount of charge in the self-sensing capacitor is changed so that a touch detection signal having a value differing from the input touch driving signal may be output to the touch driver 210. Contact information such as a contact state or a contact position may be found through the change of the touch detection signal.

It will be assumed that the touch panel 10 is a self-sensing capacitor and it includes sixteen touch sensor electrodes T11 to T44 arranged in a matrix format on the touch panel 10.

The touch detection signal may correspond to raw data supplied by the touch panel 10 to respective positions of the touch panel 10 and may include capacitance, voltage or current values.

The touch sensor electrodes T11 to T44 may be provided on a same layer or different layers. The touch sensor electrode provided on the different layers may be provided on different sides of one substrate and they may be provided on the different layers on a same side.

The touch sensor electrodes T11 to T44 may be connected to the touch driver 210 through a plurality of touch wires. The touch wires may apply touch driving signals to the touch sensor electrodes T11 to T44 and may output touch detection signals to the touch driver 210.

The touch wires may be provided on a same layer as the touch sensor electrodes T11 to T44. The touch wire may be formed by a same process as the touch sensor electrodes T11 to T44 using a same material. However, the touch wire may be formed by the same process as the touch sensor electrodes T11 to T44 using a different material.

The touch wire may not be provided in the peripheral area, but it may extend in a vertical direction in the touch region and may be connected to the touch driver 210 provided on one side of the touch region. The touch sensor electrodes T11 to T44 receive a touch driving signal through the touch wire and are charged with a predetermined amount of charge.

During a driving period of one frame, the touch driver 210 outputs a touch driving signal to the touch sensor electrodes T11 to T44. During a sensing period after the driving period, the touch driver 210 may receive a touch detection signal from the touch sensor electrodes T11 to T44.

The touch driver 210 may output a touch driving signal to the touch sensor electrodes T11 to T44 during the driving period, and when a touch detection signal that is different from the touch driving signal is provided by the touch sensor electrodes T11 to T44 during the sensing period, the touch driver 210 may transmit the touch detection signal to the touch controller 220.

The touch driver 210 may output the touch driving signal during the driving period for every frame. To reduce the power consumption according to the outputting of the touch driving signal, the touch driver 210 may output the touch driving signal during the driving period for only selected frames.

The touch controller 220 may process the touch detection signal provided by the touch panel 10 through the touch driver 210, and may output touch information, such as coordinates, to the application processor 30. The touch information may be a stream of data corresponding to positions (e.g., changes of the capacitance, voltage, or current that is high enough to detect a touch event) where the touches caused by the user are detected. The touch information may further include pressure data indicating the pressure applied to the touch panel 10.

The touch controller 220 processes the touch detection signal and stores a history (e.g., a number of times) of touch events of the touch sensor electrodes T11 to T44 in the memory 230. The touch controller 220 may store the touch history in the memory 230 in connection with application software performed by the application processor 30. For example, when game application software is performed by the application processor 30, the user may touch specific touch area in the touch panel 10 for gaming. The specific touch area includes specific touch electrodes among the touch sensor electrodes T11 to T44. Then the touch controller 220 may store information regarding the specific touch electrodes in connection with the game application software.

The touch controller 220 controls an outputting operation of the touch driving signal by the touch driver 210. For example, the touch controller 220 controls the touch driver 210 so as to selectively output the touch driving signal to a predetermined number of touch sensor electrodes from among a plurality of touch sensor electrodes T11 to T44.

When the touch driver 210 outputs the touch driving signal during the driving period to only a part of the touch sensor electrodes T11 to T44, the touch controller 220 controls the touch driver 210 to output the touch driving signal only to part of a plurality of touch sensor electrodes T11 to T44 during the driving period.

The application processor 30 processes touch information and application software driven by the application processor 30 may render video images (or frames or video images) to be displayed on the display panel.

The application processor 30 may include a central processing unit (CPU) and a graphical processing unit (GPU).

The above-described touch sensing device 20 may sense various types of touches on the touch panel 10, such as a short touch (or a tap touch), a long touch, a multi touch, a drag touch, a flick touch, a pinch-in touch, a pinch-out touch, a swipe touch, or a hovering touch.

In an exemplary embodiment, the touch panel 10, the touch driver 210, the touch controller 220, and the display panel are constituent elements of the display module, and they may be separable from the application processor 30.

A method for driving a touch sensing device 20 will now be described with reference to FIG. 2 to FIG. 6.

Figure 2:
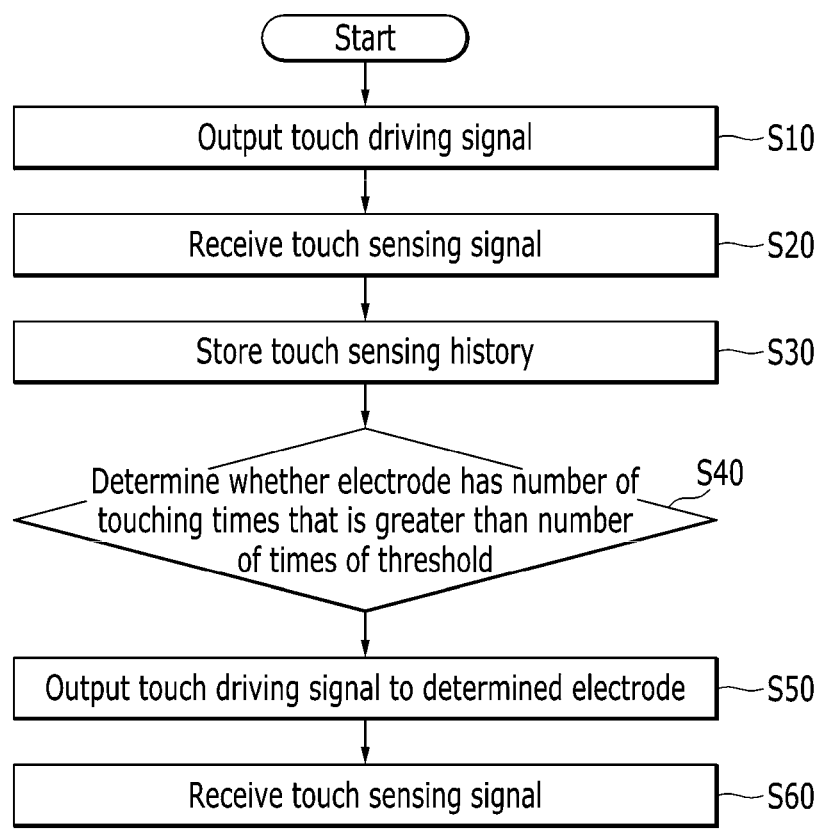
FIG. 2 shows a flowchart of a method for driving a touch sensing device according to an exemplary embodiment.

FIG. 2 shows a flowchart of a method for driving a touch sensing device 20 according to an exemplary embodiment.

The touch driver 210 outputs a touch driving signal to the touch sensor electrodes T11 to T44 (S10). The touch driving signal may be a voltage having a predetermined level. The touch driver 210 may repeatedly output the touch driving signal to the sensor electrodes. For example, the touch driver 210 outputs the touch driving signal to the touch sensor electrodes T11 to T44 during the driving period in all consecutive frames.

The touch driver 210 receives a touch detection signal (S20). The touch driver 210 may be touched by a pointing tool and may receive a touch detection signal having a different value from the touch driving signal. The touch driver 210 may repeatedly receive the touch detection signal from the sensor electrodes. For example, the touch driver 210 may detect the touch detection signal during the sensing period in all consecutive frames. The touch driver 210 may output the touch detection signal to the touch controller 220.

The touch controller 220 stores the history of touch which indicates a number of times when respective touch sensor electrodes T11 to T44 are touched in the memory 230 (S30). For example, the touch controller 220 may compile a number of times that the sixteen touch sensor electrodes T11 to T44 are touched and may store the same in the memory 230, which will be described with reference to FIG. 3.

FIG. 3 shows a touch history of a touch sensing device 20 according to an exemplary embodiment. As shown, the number of times when the touch sensor electrodes T11 to T44 are touched is stored in the memory 230. For example, the first electrode T11 is touched 210 times, and the second electrode T12 is touched 10 times.

The touch controller 220 may store the touch history in the memory 230 when the touch sensing device 20 is turned on and the touch driver 210 outputs a touch driving signal. When a predetermined time passes from the moment the touch sensing device 20 is turned on, the touch controller 220 may refresh the touch history stored in the memory 230. Or, when the touch driver 210 outputs the touch driving signal more than a predetermined number of times, the touch controller 220 may refresh the touch history stored in the memory 230.

The touch controller 220 reads the touch history stored in the memory 230, and determines which touch sensor electrodes have more than a predetermined touch frequency. For example, the touch controller 220 selects touch sensor electrodes for which the number of touch events is greater than a threshold number of touch event by using the touch history in the memory 20 (S40). For example, when the threshold number of touch events is 150, it determines that the electrodes T11, T22, T23, T33, T42, and T43 are touched more than the threshold number of touch events, as shown in FIG. 3.

The touch driver 210 selectively outputs the touch driving signal to the determined touch sensor electrodes T11, T22, T23, T33, T42, and T43 (S50). The touch controller 220 may control the touch driver 210 to selectively output the touch driving signal to the determined electrodes T11, T22, T23, T33, T42, and T43.

In one embodiment, when the touch driver 210 outputs the touch driving signal to the touch sensor electrodes during the driving period, the touch driver 210 may, through controlling the touch controller 220, selectively output the touch driving signal to the determined electrodes T11, T22, T23, T33, T42, and T43 during the driving period and not output the touch driving signal to undetermined electrodes during a predetermined driving period. Therefore, the touch driving signal is not output to the touch sensor electrodes T11 to T44, thereby reducing power consumption caused by the touch driving signal.

In another embodiment, in order to reduce power consumption, when the touch driver 210 outputs the touch driving signal to all the touch sensor electrodes T11 to T44 during only selected frames, the touch driver 210 may further selectively output the touch driving signal to the electrodes T11, T22, T23, T33, T42, and T43 during non-selected driving periods. Therefore, the touch driving signal may be selectively output to the touch sensor electrode with a high touching frequency by the user even when the other touch sensor electrodes with a low touching frequency do not receive the touch driving signal.

The touch driver 210 receives the touch detection signal from the selected touch sensor electrodes T11, T22, T23, T33, T42, and T43 (S60). When receiving a touch detection signal that is different from the touch driving signal from the selected touch sensor electrodes T11, T22, T23, T33, T42, and T43 during the sensing period, the touch driver 210 may transmit the touch detection signal to the touch controller 220.

An exemplary embodiment will now be described with reference to FIG. 4 and FIG. 5.

Figure 4:
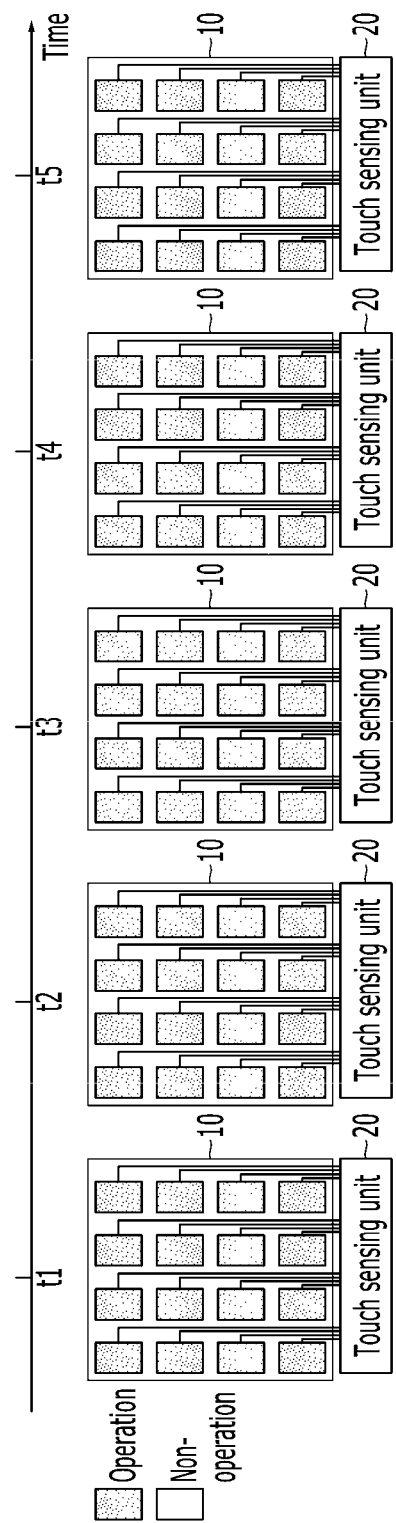
FIG. 4 and FIG. 5 show a timing diagram of a method for driving a touch sensing device according to an exemplary embodiment.
Figure 5:
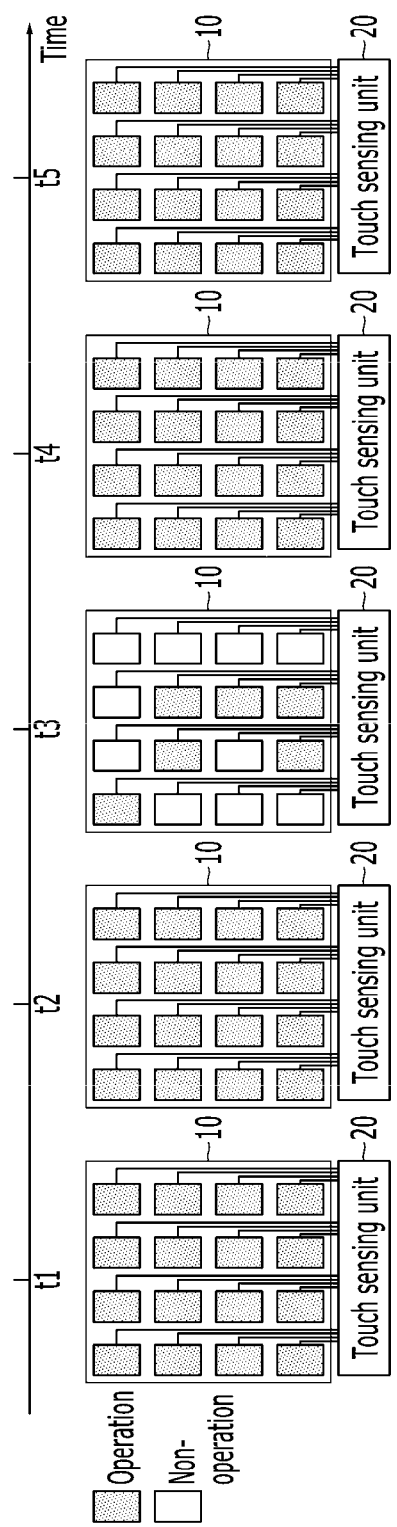

FIG. 4 and FIG. 5 show a timing diagram of a method for driving a touch sensing device 20 according to an exemplary embodiment.

As shown in FIG. 4, the touch driver 210 in the touch sensing unit 20 outputs the touch driving signal to the touch sensor electrodes during the driving period in consecutive frames. At timing t1 to t5, the touch driver 210 outputs the touch driving signal to the touch sensor electrodes T11 to T44 to charge the touch sensor electrodes T11 to T44 with a predetermined amount of charge.

As shown in FIG. 5, the touch driver 210 in the touch sensing unit 20 may selectively output the touch driving signal to the electrodes T11, T22, T23, T33, T42, and T43 during the driving period in at least one of the consecutive frames. At timing t1, t2, t4, and t5, the touch driver 210 outputs the touch driving signal to all the touch sensor electrodes T11 to T44 to charge the touch sensor electrodes T11 to T44 with a predetermined amount of charge. At timing t3, the touch driver 210 may selectively output the touch driving signal to the electrodes T11, T22, T23, T33, T42, and T43.

Another exemplary embodiment will now be described with reference to FIG. 6 and FIG. 7.

Figure 6:
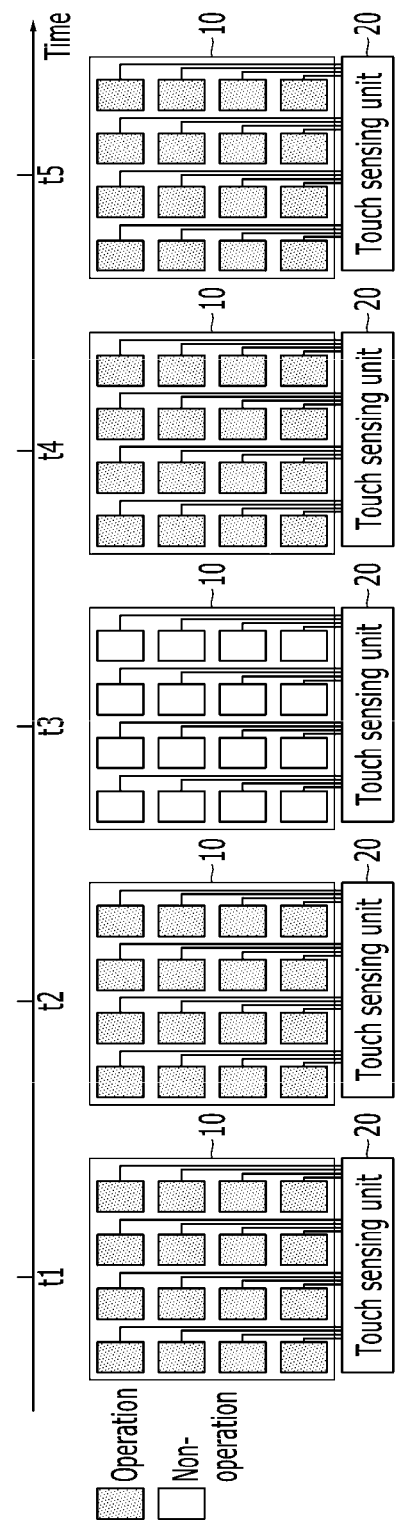
FIG. 6 and FIG. 7 show a timing diagram of a method for driving a touch sensing device according to another exemplary embodiment.
Figure 7:
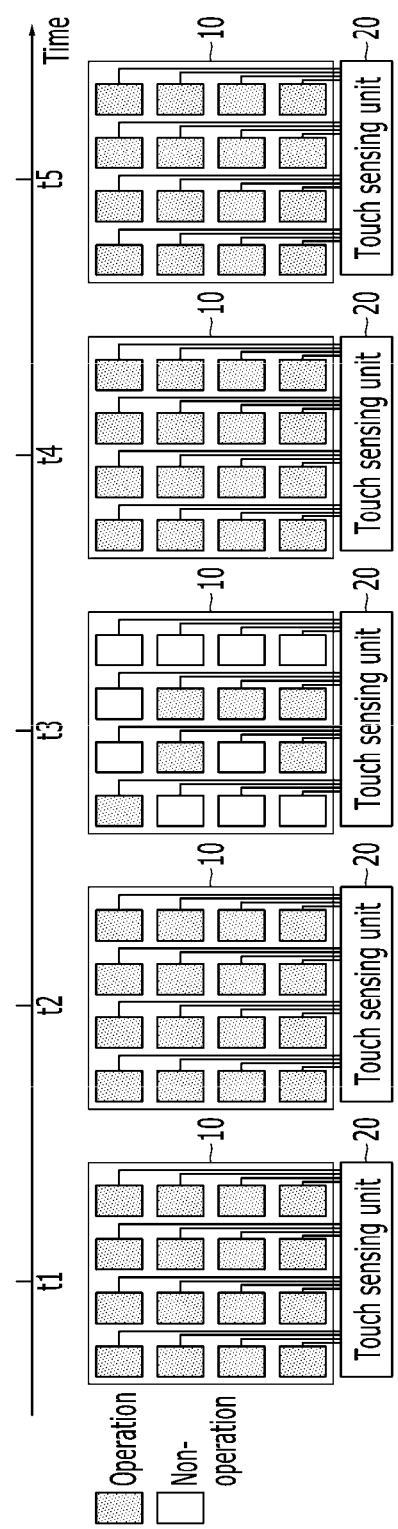

FIG. 6 and FIG. 7 show a timing diagram of a method for driving a touch sensing device 20 according to another exemplary embodiment.

As shown in FIG. 6, the touch driver 210 in the touch sensing unit 20 outputs a touch driving signal during a driving period of frames, excluding some of the consecutive frames, so as to reduce power consumption. At timing t1, t2, t4, and t5, the touch driver 210 outputs the touch driving signal to the touch sensor electrodes T11 to T44 to charge the touch sensor electrodes T11 to T44 with a predetermined amount of charge.

As shown in FIG. 7, the touch driver 210 may selectively output the touch driving signal to the electrodes T11, T22, T23, T33, T42, and T43 during the driving period in the frame outputting no touch driving signal. At timing t1, t2, t4, and t5, the touch driver 210 outputs the touch driving signal to all the touch sensor electrodes T11 to T44 to charge the touch sensor electrodes T11 to T44 with a predetermined amount of charge, and at timing t3, it may selectively output the touch driving signal to the electrodes T11, T22, T23, T33, T42, and T43.

Another exemplary embodiment will now be described with reference to FIG. 8.

Figure 8:
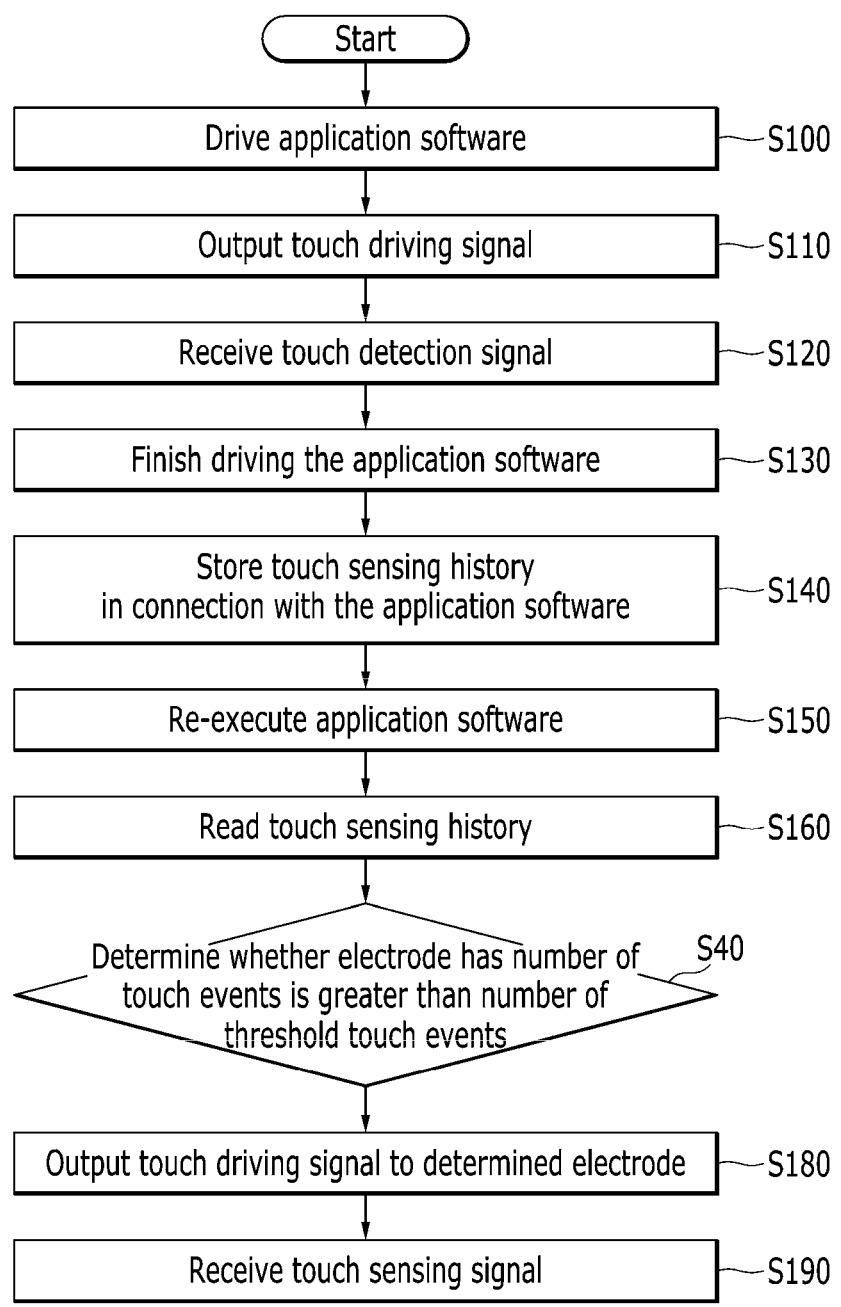
FIG. 8 shows a flowchart of a method for driving a touch sensing device according to another exemplary embodiment.

FIG. 8 shows a flowchart of a method for driving a touch sensing device 20 according to another exemplary embodiment.

The application processor 30 drives application software (S100). The application software designed for touch interfaces uses metaphors of drawings of routes on the touch panel 10 and/or direct physical manipulation of pseudo real-world objects so as to provide visual feedback (e.g., a trace of fingers swiping or gesture-based on-screen keyboard, a trace of routes in the drawings or sketchbook applications, and routes drawn in a game).

When the application software is driven, the application processor 30 may transmit information on corresponding application software to the touch controller 220. For example, the application processor 30 transmits information such as a title or a version of application software to the touch controller 220.

The touch driver 210 outputs the touch driving signal to the touch sensor electrodes T11 to T44 (S110). The touch driving signal may be a voltage having a predetermined level. The touch driver 210 may repeatedly output the touch driving signal to the sensor electrodes. For example, the touch driver 210 outputs the touch driving signal to the touch sensor electrodes T11 to T44 during the driving period in consecutive frames.

The touch driver 210 receives a touch detection signal (S120). The touch driver 210 may be touched by a pointing tool and may receive a touch detection signal having a different value from the touch driving signal. The touch driver 210 may repeatedly receive the touch detection signal from the sensor electrodes. For example, the touch driver 210 may detect the touch detection signal during the sensing period in consecutive frames. The touch driver 210 may output the touch detection signal to the touch controller 220.

When receiving a user's manipulation for finishing the application, the application processor 30 finishes driving of the application software (S130).

The touch controller 220 stores the history of touch event of the respective touch sensor electrodes T11 to T44 in the memory 230 in connection with application software (S30). The touch controller 220 may compile the number of times that the sixteen touch sensor electrodes T11 to T44 are touched and may store the same in the memory 230 while application software is driven. Here, the touch controller 220 connects the title of application software and the touch history and stores them in the memory 230.

The touch controller 220 may store in the memory 230 the touch history generated after the touch sensing device 20 is turned on and the touch driver 210 outputs a touch driving signal while the application software is driven. When a predetermined time passes after the touch sensing device 20 is turned on, the touch controller 220 may refresh the touch history stored in the memory 230. Instead, the touch controller 220 may refresh the touch history stored in the memory 230 after the touch driver 210 outputs the touch driving signal more than a predetermined number of times.

When receiving a user's manipulation for performing application software, the application processor 30 is used, and the application software is driven again (S150).

The touch controller 220 reads the touch history from the memory 230 (S160), and determines electrodes for which the number of touch events is greater than a threshold number of touch events by using the touch history (S170). The touch controller 220 may determine whether the respective electrodes are touched more than the threshold number of touch events by using the touch history.

The touch driver 210 selectively outputs the touch driving signal to the determined touch sensor electrodes T11, T22, T23, T33, T42, and T43 while the application software is driven (S180). The touch controller 220 may control the touch driver 210 to output the touch driving signal only to the electrodes T11, T22, T23, T33, T42, and T43.

In one embodiment, while the application software is driven, when the touch driver 210 outputs the touch driving signal to all the touch sensor electrodes T11 to T44 during the driving period in consecutive frames, the touch driver 210 may, through controlling the touch controller 220, selectively output the touch driving signal to the determined electrodes T11, T22, T23, T33, T42, and T43 during a predetermined driving period in the consecutive frames. The touch driving signal is not output to the undetermined touch sensor electrodes during the predetermined driving period, thereby reducing power consumption caused by the touch driving signal.

In another embodiment, when the touch driver 210 selectively outputs the touch driving signal to determined touch sensor electrodes during the predetermined driving period which is selected from the consecutive frames, the touch driver 210 may selectively output the touch driving signal to the determined electrodes T11, T22, T23, T33, T42, and T43 more often than the conventional driving method without increasing power consumption, thereby improving accuracy of touch sensing.

The touch driver 210 receives the touch detection signal from the determined touch sensor electrodes T11, T22, T23, T33, T42, and T43 (S190). When receiving a touch detection signal that is different from the touch driving signal from the determined touch sensor electrodes T11, T22, T23, T33, T42, and T43 for the sensing period, the touch driver 210 may transmit the same to the touch controller 220.

The present inventive concept may be implemented as a code in a computer readable medium in which a program is recorded. The computer readable medium may include all kinds of recording apparatuses in which data that may be read by a computer system is stored. An example of the computer readable medium may include a hard disk drive (HDD), a solid state disk (SSD), a silicon disk drive (SDD), a read only memory (ROM), a random access memory (RAM), a compact disk read only memory (CD-ROM), magnetic tape, a floppy disk, optical data storage, or the like, and may also include a medium implemented in a form of a carrier wave (for example, transmission through the Internet). In addition, the computer may include the application processor 30 in the terminal. Therefore, the above detailed description is not to be interpreted as being restrictive, but is to be considered as being illustrative. The scope is to be determined by a reasonable interpretation of the claims, and all varying equivalents fall within the scope.

What is claimed is:
1. A touch sensing device comprising:
   a touch panel on which a plurality of touch sensor electrodes are formed;
   a touch driver for supplying a touch driving signal to the touch sensor electrodes and receiving a touch detection signal generated by the touch driving signal;
   a touch controller for storing a history of touch events of respective touch sensor electrodes in a memory by using the touch detection signal; and a memory configured to communicate with the touch controller, wherein the touch controller controls the touch driver to read the history from the memory, determines determined electrodes for which a number of touch events is greater than a threshold number of touch events by using the history, and supplies the touch driving signal to the determined electrodes.

2. The touch sensing device of claim 1, wherein the touch driver outputs the touch driving signal during a driving period in consecutive frames.

3. The touch sensing device of claim 2, wherein the touch controller controls the touch driver to selectively output the touch driving signal to the determined electrodes during a predetermined driving period in the consecutive frames.

4. The touch sensing device of claim 1, wherein the touch driver selectively outputs the touch driving signal to the determined electrodes and do not outputs the touch driving signal to undetermined electrodes during a predetermined driving period.

5. The touch sensing device of claim 4, wherein the touch sensing device includes a first operation stage for collecting touch history and a second operation stage for controlling the touch sensing device using the collected touch history, and wherein the touch controller controls the touch driver to output the touch driving signal more frequently during the second operation stage than the first operation stage to the determined electrodes.

6. The touch sensing device of claim 1, wherein the touch controller refreshes the history of touch events stored in the memory when a predetermined time passes after the touch driver outputs the touch driving signal.

7. The touch sensing device of claim 1, wherein the touch controller refreshes the history of touch events in the memory after the touch driver outputs the touch driving signal more than a predetermined number of times.

8. The touch sensing device of claim 1, wherein the touch controller receives information on a non-transitory application software from an application processor for driving the non-transitory application software, correlates the history of the touch events and the information on the non-transitory application software, and stores the history of the touch events and the information on the non-transitory application software in the memory while the non-transitory application software is driven.

9. The touch sensing device of claim 8, wherein when the non-transitory application software is driven again, the touch controller controls the touch driver to read the history from the memory, determines an electrode for which a number of touch events is greater than a threshold number of touch events by using the history, and selectively supplies the touch driving signal to the determined electrodes.

10. The touch sensing device of claim 1, wherein the touch panel includes a plurality of self-sensing capacitors connected to the touch driver through respective touch wires.

11. A method for driving a touch sensing device comprising:

supplying a touch driving signal to a plurality of touch sensor electrodes formed on a touch panel;

receiving touch detection signals generated by the touch driving signal;

storing a history of touch events of respective touch sensor electrodes in a memory by using the touch detection signals;

determining determined electrodes for which a number of touch events is greater than a threshold number of touch events by using the history; and supplying the touch driving signal to the determined electrodes.

12. The method of claim 11, wherein the supplying of a touch driving signal to a plurality of touch sensor electrodes includes outputting the touch driving signal during a driving period in consecutive frames.

13. The method of claim 12, wherein the supplying of the touch driving signal to the determined electrodes includes selectively outputting the touch driving signal to the determined electrodes during a predetermined driving period in the consecutive frames.

14. The method of claim 11, wherein the supplying of a touch driving signal to a plurality of touch sensor electrodes includes selectively outputting the touch driving signal to the determined electrodes during a predetermined driving period.

15. The method of claim 14, wherein the touch sensing device includes a first operation stage for collecting touch history and a second operation stage for controlling the touch sensing device using the collected touch history, and wherein the supplying of the touch driving signal to the determined electrodes includes outputting the touch driving signal more frequently during the second operation period than the first operation stage to the determined electrodes.

16. The method of claim 11, further comprising refreshing the history of touch events stored in the memory when a predetermined time passes after the touch driving signal is output.

17. The method of claim 11, further comprising refreshing the history of touch events in the memory after the touch driving signal is output more than a predetermined number of times.

18. The method of claim 11, further comprising before the supplying a touch driving signal to the touch sensor electrodes, receiving information on a non-transitory application software from an application processor for driving the non-transitory application software, wherein the storing of a history of touch events of respective touch sensor electrodes in a memory by using the touch detection signal includes correlating the history of the touch events and the information on the non-transitory application software and storing the history of the touch events and the information on the non-transitory application software in a memory while the non-transitory application software is driven.

19. The method of claim 18, wherein the determining of an electrode for which a number of touch events is greater than a threshold number of touch events by using the history includes, when the non-transitory application software is driven again, reading the history from the memory, and determining an electrode for which a number of touch events is greater than a threshold number of touch events by using the history.

\* \* \* \* \*